United States Patent [19]

Mizukami

[11] Patent Number: 4,941,144
[45] Date of Patent: Jul. 10, 1990

[54] DATA TRANSMISSION DEVICE CAPABLE OF ADAPTIVELY VARYING A PACKET SIZE WITHOUT AN INCREASE IN HARDWARE

[75] Inventor: Toshihiko Mizukami, Tokyo, Japan
[73] Assignee: NEC Corporation, Tokyo, Japan
[21] Appl. No.: 202,291
[22] Filed: Jun. 6, 1988
[30] Foreign Application Priority Data Jun. 5, 1987 [JP] Japan .................................. 62-140103

[51] Int. Cl.$^5$ ............................................. G08C 25/02
[52] U.S. Cl. ......................................... 371/5.5; 371/32
[58] Field of Search ......................... 371/5, 32, 33, 5.5; 370/60, 85, 86, 94

[56] References Cited

U.S. PATENT DOCUMENTS

| | | | |
|---|---|---|---|
| 4,516,239 | 5/1985 | Maxemchuk ........................... | 370/85 |
| 4,589,111 | 5/1986 | Adachi .................................. | 371/32 |
| 4,617,657 | 10/1986 | Drynan et al. ........................ | 370/60 |
| 4,665,519 | 5/1987 | Kirchner et al. ..................... | 370/94 |
| 4,720,829 | 1/1988 | Fukasawa et al. .................... | 371/5 |
| 4,803,685 | 2/1989 | Oget ..................................... | 371/33 |

Primary Examiner—Charles E. Atkinson
Attorney, Agent, or Firm—Foley & Lardner, Schwartz, Jeffery, Schwaab, Mack, Blumenthal & Evans

[57] ABSTRACT

In a data transmission device operable in accordance with a protocol such that the same transmission data packet is automatically repeated on nonreception of the transmission data packet at a reception end, a repetition number of the same transmission data packet is measured in a protocol interface circuit together with a selected one of a packet size and a data size carried by the transmission data packet. The repetition number and the selected size are supplied to first and second conversion tables to be converted into first and second factors which are related to a bit error rate of the transmission data packet on a transmission line and a correction factor of the first factor, respectively. The first and the second factors are added to each other to be averaged into an estimation factor of the bit error rate in consideration of preceding data packets. The estimation factor is converted by the use of a third conversion table into an optimum size of either a packet size or a data size. Consequently, transmission efficiency is improved by transmitting each transmission packet with an optimum size.

4 Claims, 6 Drawing Sheets

DATA TRANSMISSION DEVICE CAPABLE OF ADAPTIVELY VARYING A PACKET SIZE WITHOUT AN INCREASE IN HARDWARE

BACKGROUND OF THE INVENTION

This invention relates to a data transmission device which is operable in accordance with a protocol wherein a transmission packet size is adaptively variable in consideration of a bit error rate on a transmission line.

In order to define and implement communication between personal computers, a strong interest has been focused on Microcom Networking Protocol (often be abbreviated to MNP) which has been proposed by Microcom Corporation. Therefore, description will be mainly directed to the MNP, although this invention is never restricted to the MNP. The MNP is specified by detecting a transmission error by the use of a cyclic redundancy check technique and by automatically repeating a transmission data packet as long as no acknowledgement is received from a reception side. As a result, a communication system operable in accordance with the MNP may be collectively called an automatic repeat system.

Herein, it is to be noted that the MNP is classified into first through seventh classes in correspondence to modems to be used and additional functions assigned thereto. In the automatic repeat system of the first through third classes of the MNP, each input data signal is changed into a transmission data packet which carries an additional signal in addition to the input data signal. The additional signal may be, for example, a start flag, an end flag, and a check signal for checking an error and is therefore composed of a plurality of bits. Inasmuch as the additional signal is invariable in a bit number irrespective of a bit length, namely, a data size of the input data signal, a rate of the additional signal increases in a packet when the data signal has a short data size. This inevitably results in a reduction of transmission efficiency. In order to improve the transmission efficiency of a packet, it may be considered to make a data size long in each packet. However, a packet of such a long data size is susceptible to an error on a transmission line. As a result, the packet of a long data size must be repeatedly transmitted again and again. This might give rise to an increase of a repetition number of a packet and results in a reduction of total transmission efficiency. Thus antinomy takes place between a data size and transmission efficiency.

On the other hand, the fourth through seventh classes of the MNP are defined to adaptively vary a data frame length or a packet in consideration of a quality of a transmission line through which the transmission data packet is transmitted. The quality of a transmission line may be evaluated by a bit error rate, as well known in the art. In order to carry out communication in compliance with the fourth through seventh classes, it is necessary to adaptively decide an optimum packet size by monitoring a bit error rate in accordance with a preselected algorithm and to thereby obtain maximum transmission efficiency. Under the circumstances, a communication system according to the fourth through seventh classes of the MNP will be referred to as a variable packet system.

Herein, an optimum packet size must be decided by calculating a bit error rate from a repetition number of a packet by the use of the preselected algorithm. However, intricate calculations should be carried out to decide such an optimum packet size with real time because the preselected algorithm is usually specified by complicated nonlinear equations. Accordingly, an increase of hardware is inevitable for adaptively varying a packet size.

SUMMARY OF THE INVENTION

It is an object of this invention to provide a data transmission device which is capable of reducing an amount of hardware which is used for adaptively varying a packet size or a data size.

It is another object of this invention to provide a data transmission device of the type described, which can dispense with complicated calculations.

A data transmission device to which this invention is applicable is for use in transmitting a transmission data packet in response to an input data signal in accordance with a predetermined protocol such that a transmission data packet can be automatically repeated on nonreception of the transmission data packet at another end coupled to the data transmission device through a transmission line and is variable in a packet size with reference to a bit error rate on the transmission line. The transmission data packet carries the input data signal having a data size shorter than the packet size. According to this invention, the data transmission device comprises protocol interface means responsive to the input data signal and a size control signal and controllably operable in accordance with the predetermined protocol for repeatedly transmitting the transmission data packet onto the transmission line by measuring a repetition number of the transmission data packet and a selected one of the packet size of the transmission data packet and the data size, a first conversion table coupled to the protocol interface means and responsive to the repetition number of the transmission data packet for converting the repetition number into a first factor related to the bit error rate, a second conversion table coupled to the protocol interface means and responsive to the selected one of the packet size and the data size for converting the selected size into a second factor representative of a correction factor dependent on said selected size, processing means coupled to the first and the second conversion tables for processing the first and the second factors to produce a third factor representative of an estimation value determined in relation to the bit error rate, a third conversion table coupled to the processing means for converting the third factor into a fourth factor related to a selected one of the packet size and the data size, and means for supplying the fourth factor to the protocol interface means as the size control signal.

DESCRIPTION OF THE PREFERRED EMBODIMENT

Figure 1:
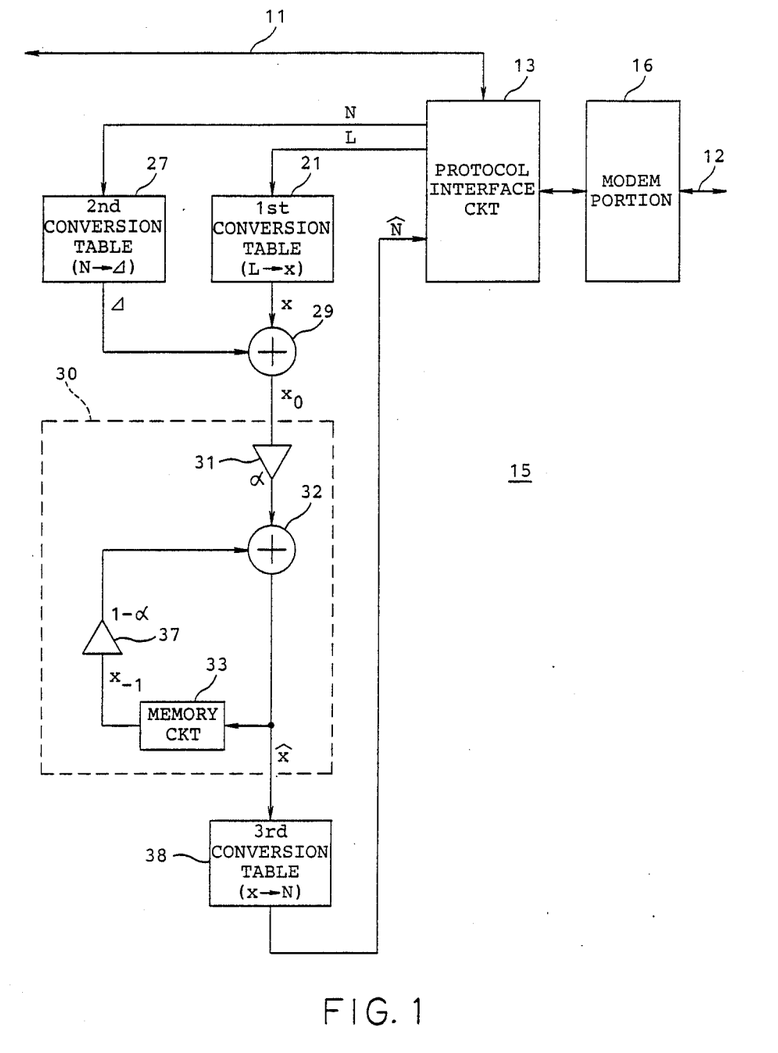
FIG. 1 is a block diagram of a data transmission device according to a preferred embodiment of this invention.

Referring to FIG. 1, a data transmission device according to a preferred embodiment of this invention is coupled to an input/output device (not shown) and another data transmission device (not shown) through a data line 11 and a transmission line 12, respectively. Although the illustrated data transmission device can receive and transmit a data packet through the transmission line 12, only transmission operation to the transmission line 12 will be described with reference to FIG. 1. In this connection, such a data packet will be called a transmission data packet.

The data transmission device comprises a protocol interface circuit 13 supplied through the data line 11 with an input data signal and a controller 15 which controls the protocol interface circuit 13 in a manner to be described later. It will be assumed that the protocol interface device 13 is operable in accordance with a protocol which may be, for example, the MNP (microcom networking protocol) or the like. In this connection, the illustrated protocol interface device 13 serves to successively produce a transmission data packet with an optimum packet size under control of the controller 15 and to transmit the same through a modem portion 16 to the transmission line 12. In this event, a redundancy bit signal, such as a check bit signal, is carried by the transmission data packet so as to detect an error which might occur on the transmission line 12.

Figure 2:
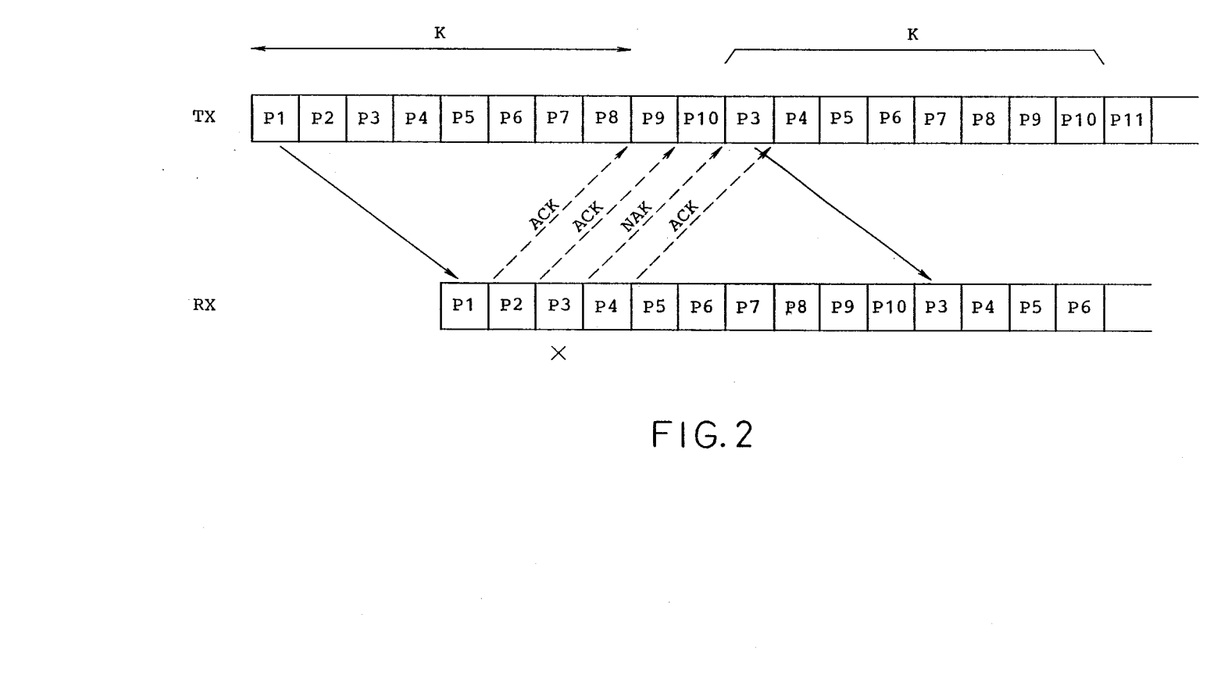
FIG. 2 is a time chart for use in describing operation of the data transmission device illustrated in FIG. 1.

Referring to FIG. 2 together with FIG. 1, the data transmission device forms a transmission end depicted at TX and is assumed to communicate through the transmission line 12 to a reception end depicted at RX. The illustrated transmission end TX successively sends first through tenth transmission data packets P1 to P10 to the reception end while the reception end RX sends, back to the transmission end TX, either an acknowledgement signal ACK or a negative acknowledgement signal NAK when each of the first through tenth transmission data packets P1 to P10 is correctly or incorrectly received by the receiving end RX. The negative acknowledgement signal NAK may be a repeat request signal. In the example being illustrated, the transmission end TX receives the acknowledgement signals ACK for the first and the second transmission data packets P1 and P2 before transmission of the ninth and the tenth transmission data packets P9 and P10, respectively. The negative acknowledgement signal NAK for the third transmission data packet P3 is sent from the reception end RX and is received by the transmission end TX after transmission of the tenth transmission data packet P10. On reception of the negative acknowledgement signal NAK, the transmission end TX interrupts transmission of data packets following the tenth transmission data packet P10 and repeats transmission from the third transmission data packet P3 again. As a result, the third through tenth transmission data packets P3 to P10 are successively resent to the receiving end RX, as shown in FIG. 2.

From this fact, it is readily understood that, on reception of the negative acknowledgement signal NAK for a certain transmission data packet, the transmission end TX repeats eight transmission data packets including the certain transmission data packet and the following seven transmission data packets. Thus, eight transmission data packets are repeated in the illustrated example. The number of the transmission data packets repeatedly transmitted may be called a repeat packet number which will be depicted at K.

Such a repeat operation is carried out L times until reception of the acknowledgement signal ACK, where L represents a natural number and may be called a repetition number. At any rate, the transmission data packet is successively produced from the protocol interface circuit 13 and may be considered as being preceded by a preceding data packet.

In FIG. 1, the protocol interface circuit 13 can adaptively vary a packet size in cooperation with the controller 15. To this end, the protocol interface circuit 13 comprises a counter for counting the repetition number L and a measurement circuit for measuring a packet size N of each transmission data packet. The counter and the measurement circuit can be implemented by a usual circuit technique and are therefore not shown in this figure. At any rate, the repetition number L and the packet size N are sent from the protocol interface circuit 13 to the controller 15 in the form of a repetition number signal and a packet size signal, respectively, when the protocol interface circuit 13 confirms normal reception. The packet size N may be expressed at a byte unit or an octet unit and may therefore be represented by the number of bytes or octets.

The controller 15 is operable in response to the repetition number signal and the packet size signal to process the repetition number L and the packet size N in accordance with algorithm determined in the controller 15 and to supply the protocol interface circuit 13 with an optimum packet size signal representative of an optimum packet size $\hat{N}$.

Herein, description will be made about the algorithm used in the controller 15 for a better understanding of this invention. At first, let a bit error rate $\epsilon$ be estimated from the repetition number L. In general, the bit error rate $\epsilon$ is representative of a quality of the transmission line 12 and can be related to a normal reception rate p of a transmission data packet having a total bit number of m which is equal to an integral multiple of N, for example, $8 \times N$ or $10 \times N$. The normal reception rate p may be regarded as being equal to a reciprocal of the repetition number L. Under the circumstances, the bit error rate $\epsilon$ may be given by:

$$\epsilon = 10^{-x}, \tag{1}$$

where x may be referred to as a first factor and is represented by:

$$x = -log(1 - (L)^{-(1/m)}). \tag{2}$$

At any rate, it may be said that the first factor x is representative of an exponent component of Equation (1) and may therefore be used to specify the bit error rate $\epsilon$. Taking the above into consideration, the controller 15 comprises a first conversion table, namely, memory 21 so as to convert the repetition number L into the first factor x.

Figure 3:
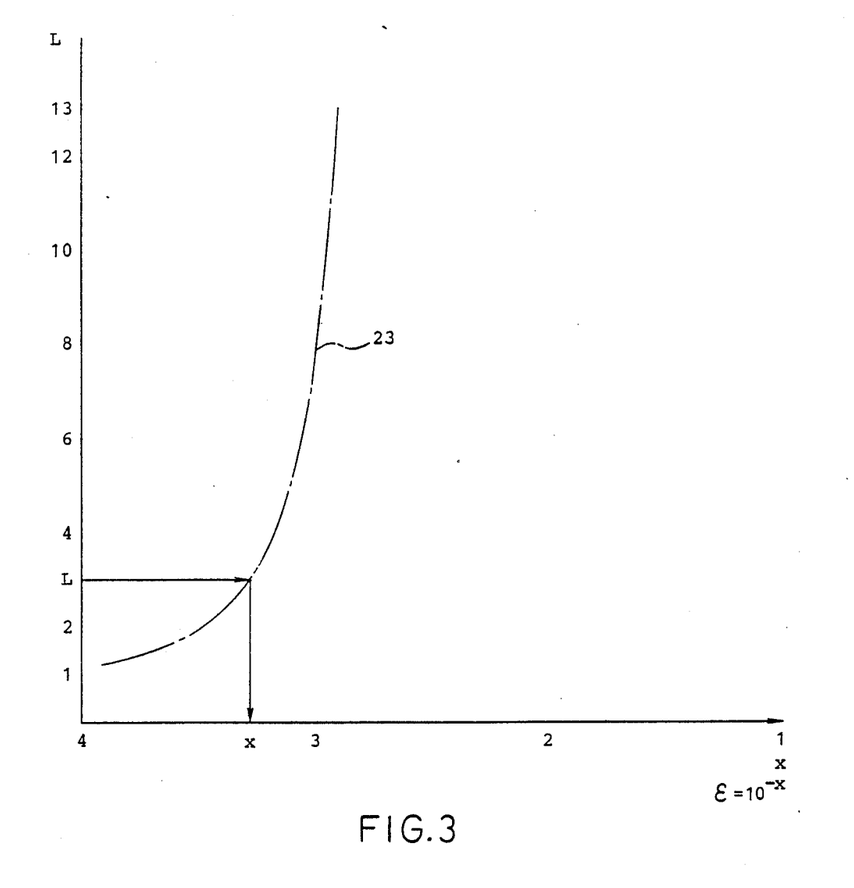
FIG. 3 is a graphical representation for use in describing a relationship between a factor related to a bit error rate and a repetition number of a transmission data packet.

Referring to FIG. 3, the first conversion table 21 memorizes, as the first factor x, a plurality of first factor values calculated in accordance with a curve 23. It is to be noted that the curve 23 represents that relationship between the repetition number L and the first factor x which is obtained when the packet size N is equal to 256 bytes. Herein, the first factor x is assumed to be equal to seven (7) in case of the repetition number L=1. In addition, the first factor x becomes small with an increase of the repetition number L, as apparent from FIG. 3.

The first factor x is not always correctly made to correspond to the bit rate ε when the packet size N is varied from 256.

Figure 4:
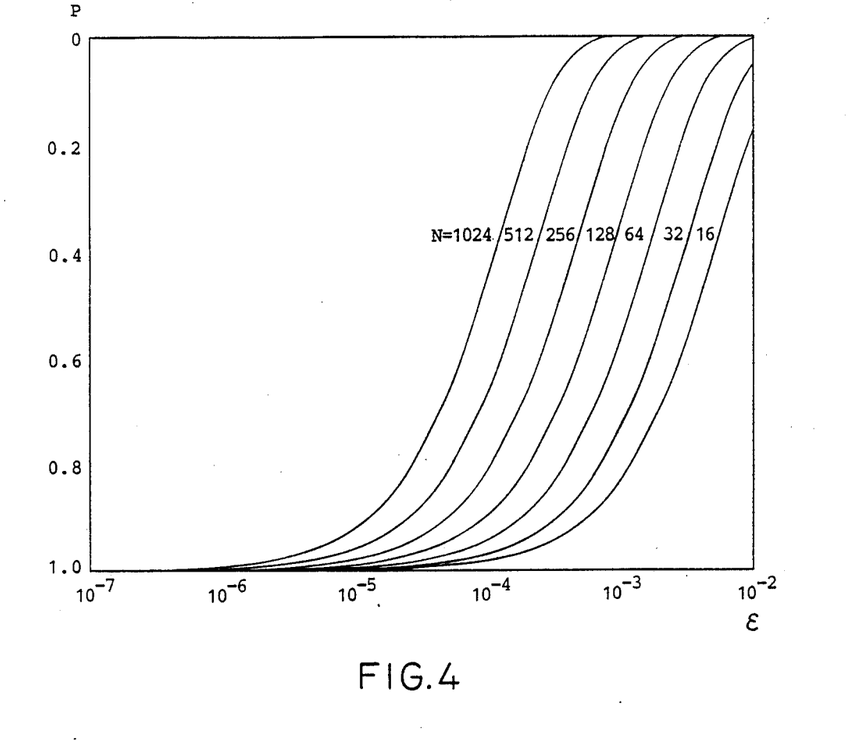
FIG. 4 is a graphical representation for use in describing a relationship between the bit error rate and a normal reception rate.

Referring to FIG. 4, wherein an abscissa and an ordinate represent the bit error rate ε and the normal reception rate p, respectively, each of first through seventh curves numbered from a lefthand side of FIG. 4 rightwards shows that relationship between the bit error rate ε and the normal reception rate p which appears when the packet size N is equal to 1024, 512, 256, 128, 64, 32, or 16 bytes. As readily understood from each of the first through seventh curves, the normal reception rate p becomes near to 1.0 as the bit error rate ε becomes small, namely, the first factor x becomes large. Comparison of the first through seventh curves with one another shows that the normal reception rate p becomes low or near to zero as the packet size N becomes long, when the bit error rate ε is invariable.

The first factor x produced from the first conversion table 21 specifies the third curve (N=256) in FIG. 4 and is therefore to be amended or adjusted in consideration of the packet size N. To this end, a second conversion table or memory 27 is included in the controller 15. The second conversion table 27 memorizes a plurality of correction factors which may be collectively referred to as a second factor Δ and which correspond to variations of the packet size N. The correction factors are calculated by the use of FIG. 4 as deviations from the third curve (N=256).

Figure 5:
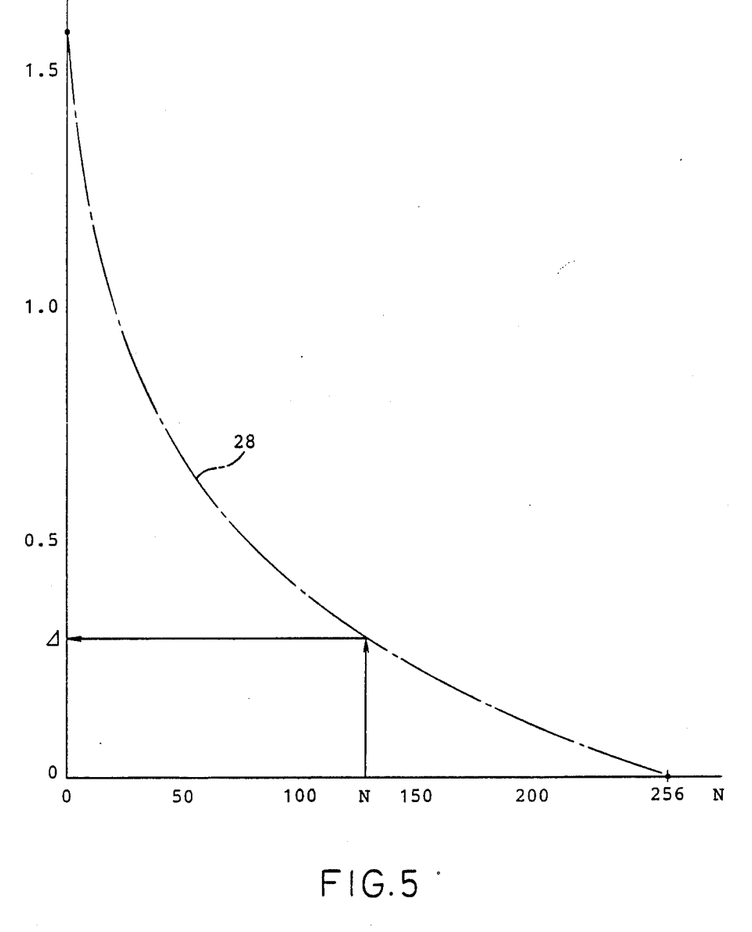
FIG. 5 is a graphical representation for use in describing a relationship between a packet size and a correction factor.

Referring to FIG. 5, a curve 28 shows a relationship between the packet size N and the second factor Δ. As is readily understood from the curve 28, the second factor Δ is equal to zero when N=256 while the second factor Δ becomes large with a decrease of the packet size N.

In FIG. 1, a selected one of the correction factors is read out of the second conversion table 27 as the second factor Δ in response to the repetition number N and is sent to an adder 29 which is supplied with the first factor x given from the first conversion table 21. The adder 29 adds the second factor Δ to the first factor x to produce a sum signal representative of a sum $x_0$ of the selected correction factor and the first factor value read out of the first and the second conversion tables 21 and 27. The sum $x_0$ may be called an adjusted factor which is related to the bit error rate ε and which is successively calculated in relation to a current one of the transmission data packets.

The sum $x_0$ is successively sent to an average calculation circuit 30 which successively calculates a mean value of a sequence of the sums $x_0$. The illustrated average calculation circuit 30 serves to calculate a weighted mean value in a manner to be described later. The weighted mean value is regarded as an estimation value or factor $\hat{x}$ determined in relation to the first factor x, namely, the bit error rate ε, and is produced as an estimation value signal. The estimation factor $\hat{x}$ will be referred to as a third factor. At any rate, such calculation of a weighted mean value is effective to smooth a rapid and transient variation which might appear in the sums $x_0$.

A combination of the first and the second conversion tables 21 and 27 and the adder 29 may be called an estimation factor calculating circuit for calculating the estimation factor $\hat{x}$.

Specifically, the average calculation circuit 30 comprises a first multiplier 31 supplied with the sum signal and a first predetermined constant α. The first predetermined constant α may be between 0 and 1, both exclusive. If the predetermined constant is equal to 0.75, 0.5, 0.375, 0.25, or 0.125, the first multiplier 31 can be simplified because multiplication can be replaced by summation, as known in the art. Thus, the first multiplier 31 multiplies the sum $x_0$ by the predetermined constant α to produce a first product signal representative of a first product $\alpha x_0$.

The first product signal is given to an adder circuit 32 which is supplied with an additional factor signal representative of an additional factor, as will become clear later. The adder circuit 32 adds the first product $\alpha x_0$ to the additional factor to produce a third factor signal representative of a result of addition, namely, the third factor between the first product $\alpha x_0$ and the additional factor. The third factor signal is produced as the estimation value signal ($\hat{x}$) and is stored in a memory circuit 33 for a single packet duration. Therefore, the memory circuit 33 delays the estimation value signal ($\hat{x}$) to produce a delayed estimation value signal $x_{-1}$. The delayed estimation value signal $x_{-1}$ is multiplied in a second multiplier 37 by a second predetermined constant equal to $(1-\alpha)$ to be produced as a second product signal representative of a second product $(1-\alpha)x_{-1}$.

When the second product signal is delivered to the adder circuit 32 as the additional factor signal, the additional factor signal is repeated to a previous data packet preceding the current data packet. Under the circumstances, the average calculation circuit 30 carries out a calculation given by:

$$\hat{x} = \alpha x_0 + (1-\alpha)x_{-1}. \tag{3}$$

It is mentioned here that the first factor x is the exponent component, as readily understood from Equations (1) and (2), and that the calculation of Equation (3) may therefore be recognized as a multiplication of the bit error rate ε specified by Equation (1). In addition, a heavy weight is added to the sum $x_0$ calculated from the current data packet, as understood from Equation (3). Therefore, the illustrated average calculation circuit 30 obtains the weighted mean value as the estimation value $\hat{x}$ by calculating a geometric mean in the above-mentioned manner. A combination of the average calculation circuit 30 and the adder 29 may be called a processing circuit for calculating the third factor.

Figure 6:
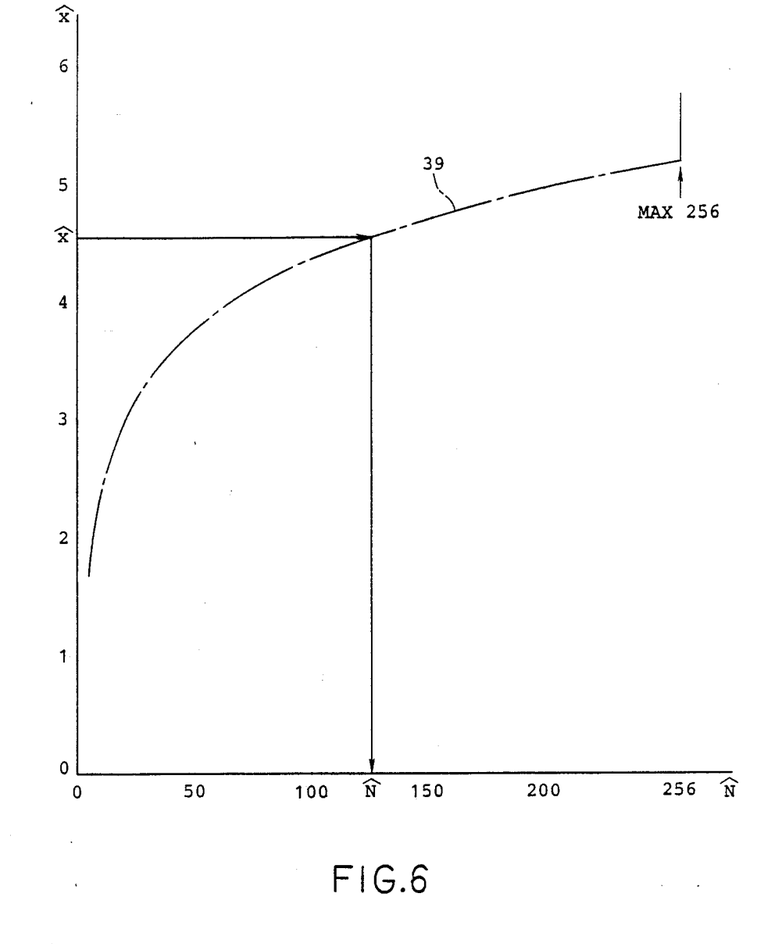
FIG. 6 is a graphical representation for use in describing a relationship between an optimum packet size and an estimation value.

Referring to FIG. 6, the estimation value $\hat{x}$ is delivered to a third conversion table or memory 38 which memorizes a plurality of optimum packet size values with reference to a curve 39 shown in FIG. 6. As understood from the curve 39, a maximum one of the optimum packet size values is equal, for example, to 256 (bytes) and is produced as the optimum packet size $\hat{N}$ when the estimation value $\hat{x}$ is equal to or greater than five. When the estimation value $\hat{x}$ becomes small, the optimum packet size $\hat{N}$ nonlinearly becomes short, as shown in FIG. 6. The optimum packet size $\hat{N}$ is sent to the protocol defining circuit 13 in the form of an optimum packet size signal and will be called a fourth factor.

Each of the optimum packet size values can be calculated from a throughput factor or transmission efficiency n which represents an amount of data signals carried by transmission data packets for a unit time. It is assumed that the data signal has a data length of M bytes in the transmission data packet of N bytes and that the transmission data packets are transmitted in the manner illustrated in FIG. 2. In order to calculate the throughput factor n, a definition must be given with respect to a transmission packet number T which is required until a single transmission data packet is correctly received by the reception end RX. Herein, the transmission packet number T is given by:

$$T = 1 \cdot p + (K+1)(1-p)p + (2K+1)(1-p)^2 p + \ldots, \quad (4)$$

on the assumption that each packet size is invariable.

In Equation (4), the first, second, and third terms in the righthand side show probability of correctly receiving the single transmission data packet at the receiving end RX once, twice, and three times of transmission, respectively. Equation (4) is rewritten into:

$$T + 1 + ((1-p)/p)K. \quad (5)$$

By the use of the transmission packet number T, the data length M, and the packet size N, the throughput factor n is represented by:

$$\begin{aligned} n &= (1/T) \cdot (M/N) \\ &= (p/(p(1-K)+K)) \cdot (M/N). \end{aligned} \quad (6)$$

Inasmuch as the normal reception rate p can be calculated by the use of the bit error rate $\epsilon$ and the total bit length m while the data length M can be represented by the packet size $\hat{N}$, the throughput factor n can be defined as a function of $\epsilon$ and N. Thereafter, the optimum packet size N can be determined by partially differentiating the throughput factor n with respect to the packet size N. As a result, the curve 39 is obtained, as shown in FIG. 6.

In FIG. 1, the protocol defining circuit 13 is supplied with the optimum packet size signal to decide a packet size of a following transmission data packet with reference to the optimum packet size $\hat{N}$.

Subsequently, the following transmission data packet is subjected to modulation and code conversion in the modem 16 and is sent through the reception end through the transmission line 12.

While this invention has thus far been described in conjunction with a preferred embodiment thereof, it will readily be possible for those skilled in the art to put this invention into practice in various other manners. For example, this invention is applicable to a device operable in accordance with SDLC (Synchronous Data Link Control procedure), BSC (Binary Synchronous Communication procedure), HDLC (High level Data Link Control procedure), and the like. In addition, it is possible to carry out similar operation when the data length M (bytes) of each transmission data packet is given from the protocol defining circuit 13 to the controller 15 instead of the packet size N.

What is claimed is:

1. A data transmission device for use in transmitting a transmission data packet in response to an input data signal in accordance with a predetermined protocol such that said transmission data packet can be automatically repeated on nonreception of said transmission data packet at another end coupled to said data transmission device through a transmission line and is variable in a packet size with reference to a bit error rate on said transmission line, said transmission data packet carrying said input data signal having a data size shorter than said packet size, said data transmission device comprising:

protocol interface means response to said input data signal and a size control signal and controllably operable in accordance with said predetermined protocol for producing a repetition number signal representative of a repetition number of said transmission data packet and a size signal representative of a selected one of said data size and said packet size;

a first conversion table coupled to said protocol interface means and responsive to said repetition number signal converting said repetition number signal into a first factor signal related to said bit error rate;

a second conversion table coupled to said protocol interface means and responsive to said size signal converting said size signal into a second factor signal representative of a correction factor dependent on a selected size;

processing means coupled to said first and said second conversion tables for processing said first and said second factor signals to produce a third factor signal representative of an estimation value determined in relation to said bit error rate and said correction factor;

a third conversion table coupled to said processing means converting said third factor signal into a fourth factor signal related to a selected one of said packet size and said data size; and means for supplying said fourth factor signal to said protocol interface means as said size control signal.

2. A data transmission device as claimed in claim 1, wherein:

said selected size is said packet size and said size signal is representative of said packet size, said second factor signal being produced for every packet, said transmission data packet being preceded by a sequence of preceding data packet; and wherein said processing means further comprises;

summing means coupled to said first and said second conversion tables for successively summing said first and said second factor signals each time each of said preceding data packets is provided together with each of said transmission data packets in pairs to produce a sequence of adjusted factors related to said preceding and said transmission data packets; and calculating means coupled to said summing means for calculating a mean value of said adjusted factors to generate a mean value signal as said third factor signal.

3. A data transmission device as claimed in claim 2, wherein said means value is a weighted mean value calculated by weighting an adjusted factor of said transmission data packet in comparison with adjusted factors of preceding data packets.

4. A controller for use in combination with a protocol interface circuit which is supplied with an input data signal and a size control signal to produce a transmission data packet in accordance with a protocol, said input data signal and said transmission data packet having a data size and a packet size determined by said size control signal, respectively, said protocol being such that said transmission data packet can be automatically repeated and is variable in packet size with reference to a bit error rate of a transmission line, said protocol interface circuit producing a repetition number signal representative of a repetition number of said transmission data packet and a size signal representative of a selected one of said data size and said packet size, said controller comprising:

conversion table means response to said repetition number signal and said size signal for converting said repetition number and said selected one of said data and said packet sizes into an adjusted factor which is related to said bit error rate in consideration of said size signal;

estimation factor calculating means coupled to said conversion table means for calculating an estimation factor from said adjusted factor in relation to said bit error rate to produce an estimation factor signal representative of said estimation factor;

additional conversion table means coupled to said estimation factor calculating means for converting said estimation factor signal into an optimum size signal which determines an optimum size of said selected one of said data and said packet sizes; and means for supplying said optimum size signal to said protocol interface circuit as said size control signal.

* * * * *